April 21, 1970  W. W. PENDLETON ETAL  3,507,824
ENAMEL COMPOSITION FOR THE INSULATION
OF HIGH-TEMPERATURE MAGNET WIRE
Original Filed Aug. 4, 1965

INVENTORS
WESLEY W. PENDLETON
GEORGE W. OSTRANDER
BY

THEIR AGENT

United States Patent Office 3,507,824
Patented Apr. 21, 1970

3,507,824
ENAMEL COMPOSITION FOR THE INSULATION
OF HIGH-TEMPERATURE MAGNET WIRE
Wesley W. Pendleton, Muskegon, Mich., and George W.
Ostrander, New Lebanon, Ohio, assignors to Anaconda
Wire and Cable Company, a corporation of Delaware
Original application Aug. 4, 1965, Ser. No. 477,248, now
Patent No. 3,442,702. Divided and this application
Nov. 22, 1968, Ser. No. 796,628
Int. Cl. C08g 51/04
U.S. Cl. 260—37                                    3 Claims

ABSTRACT OF THE DISCLOSURE

Enamel for electrical insulation at high temperatures is made up of an organic resin, a solvent, suspended glass particles with the composition, in parts by weight of, $SiO_2$:32–46, BaO:25–35, $K_2O$:10–13, $Na_2O$:4–6, $Li_2O$:1–3, ZnO:6–10, $CaF_2$:1–4, CoO:0–1.2

NiO:0–1.2, and 10–30% of the weight of the glass particles of a suspension of refractory oxide.

CROSS REFERENCE TO RELATED APPLICATION

This application is divided from application Ser. No. 477,248 filed Aug. 4, 1965, now Patent 3,442,702.

Our invention relates to electrical apparatus for use at high temperature and particularly to such apparatus comprising an electrical conductor insulated with a fused glass matrix.

It has been known to insulate magnet wire and other electrical conductors with a coating comprising fusible glass particles suspended in a suitable enamel. When the enamel has dried the wire is formed into coils. The enamel is then burned off and the glass is fused while it is still in place on the wire. Structures of this type are disclosed in applications Ser. Nos. 173,115; 178,349; 207,882; 248,328 and 362,301, assigned to the assignee of the instant invention.

Because it oxidizes rapidly at such temperatures, bare copper wire is not suitable for continued service at the very high temperatures, such as 500° C., for which the glass matrix insulation is intended. It is therefore necessary to protect the copper with a nickel or nickel alloy plating or sheath, or to use some other oxidation-resistant conductor or conductor sheathing. Due to their inertness and resistance to oxidation, such metals do not adhere well to the glass compositions that have been suggested for insulation and it is a feature of our invention that it provides a glass composition that will adhere to the conductor after the organic constituent of the enamel has been lost, and particularly that the glass will adhere to the conductor during the critical period between the burning off of the resins and the fusion of the glass particles into a coherent insulating cover around the wire.

Boron glasses become hot and undergo physical changes in high intensity radiation fields and it is a feature of our invention that it employs a boron-free glass.

Lead oxide may become reduced to metallic lead in a reducing atmosphere at elevated temperatures and metallic lead would lower the electrical insulation resistance of the glass. It is a further feature of our invention, therefore, that the glass does not contain lead oxide or other metal oxides that would reduce to conducting metals at the operating or processing temperatures of our apparatus.

Whereas glass has long been regarded as a good electrical insulator and glazes have been applied to such products as automotive spark plugs which require good insulating surfaces, these known products have not been required to function under electrical stress at very high temperatures. At temperatures, such as 500° C., the electrical conductivity of a glass composition may increase to such an extent that the glass is worthless as an insulator. In the past it had been found that alkali glasses, particularly glasses comprising $Li_2O$, were poor insulators at high temperatures. But glasses free from alkali were characterized both by poor adhesion to metal and by high melt temperatures. The melt or fusing temperature of the glass is an important consideration since it determines the temperature that a coil formed from glass-insulated wire must be brought to in order to fuse the glass insulation. If this temperature is too high the copper may melt or it may experience a disruptive grain growth. It is desirable to have a fusion point of about 700° C. and still retain high insulation resistance at 500° C. We have found that this can be done with a glass having the composition:

|  | Parts by weight |
|---|---|
| $SiO_2$ | 32–46 |
| BaO | 25–35 |
| $K_2O$ | 10–13 |
| $Na_2O$ | 4–6 |
| $Li_2O$ | 1–3 |
| ZnO | 6–10 |
| $CaF_2$ | 1–4 |
| CoO | 0–1.2 |
| NiO | 0–1.2 | and preferably with a glass having the composition

|  | Parts by weight |
|---|---|
| $SiO_2$ | 38.0 |
| BaO | 32.2 |
| $K_2O$ | 11.6 |
| $Na_2O$ | 5.0 |
| $Li_2O$ | 1.8 |
| ZnO | 8.0 |
| $CaF_2$ | 2.0 |
| CoO | 0.5 |
| NiO | 0.5 |

The known glass insulated apparatus has been, generally, of two types; one in which there is a serving of glass fibers applied in addition to the glass-particle-containing enamel and the other in which the glass serving is omitted. The properties of the glass composition of the particles of the latter structure are much more critical than the former since, when there is a glass serving a glass yarn is positively attached to the conductor by wrapping, and adhesion of the glass particles to the glass yarn presents a minimum problem. Our improvement is directed particularly to the second named structure where there is no glass serving, and good adhesion of the molten glass to an inert metal surface is essential. In such a structure, however, there is the additional problem of cut-through during the interval that the glass is coalescing and is molten. To prevent such cut-through we incorporate a substantial proportion, such as 10–30%, of refractory particles based on the weight of the glass. Although we can use almost any refractory that will not melt at the fusion temperature of the glass, and will remain chemically stable at the operating temperature of the apparatus, we prefer $Cr_2O_3$ for the refractory particles of our invention.

We have invented a magnet wire comprising a metallic conductor resistant to oxidation at high temperature such as 500° C. comprising a conductor with a nickel or nickel alloy surface, and an enamel coating surrounding the conductor comprising an organic resin composition such as a blend of silicone and polyester resins. Glass particles equalling 50 to 100% of the weight of the resin are dispersed therein. The glass has the composition tabulated hereinabove and is mixed with 10—30% of its weight of a refractory oxide such as $Cr_2O_3$ also dispersed in the resin.

We have invented an electrical apparatus comprising oxidation-resistant wire, such as wire with a nickel or nickel alloy outer surface, surrounded by an adherent fused-glass matrix comprising glass consisting of:

| | Parts by weight |
|---|---|
| $SiO_2$ | 32–46 |
| BaO | 25–35 |
| $K_2O$ | 10–13 |
| $Na_2O$ | 4–6 |
| $Li_2O$ | 1–3 |
| ZnO | 6–10 |
| $CaF_2$ | 1–4 |
| CoO | 0–1.2 |
| NiO | 0–1.2 | and 10–30% of the weight of the glass of refractory oxide particles, such as $Cr_2O_3$ particles, bonded by the glass.

An enamel of our invention for insulating magnet wire for our apparatus comprises an organic resin composition, such, preferably, as a blend of silicone and polyester resins, a solvent for said composition with the resin being dissolved in the solvent, 50 to 150% of the weight of the resins of glass particles with the composition hereinabove tabulated suspended in the enamel, and also 10–30% of the weight of the glass particles of refractory oxide particles suspended in the enamel.

A more thorough understanding of our invention may be obtained from the appended drawing.

Figure 1:
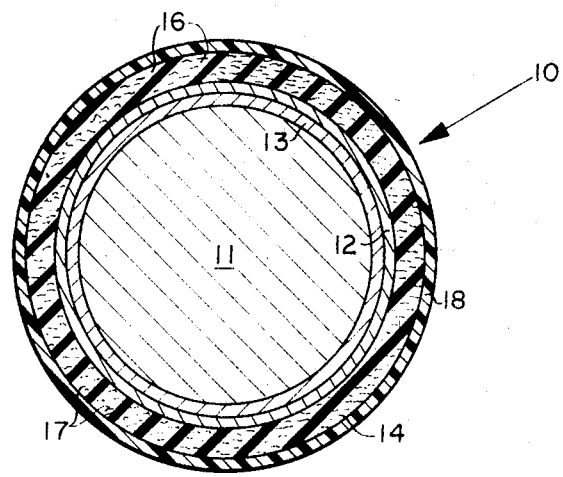
FIGURE 1 is a section of a wire coated with the enamel of our invention.
Figure 2:
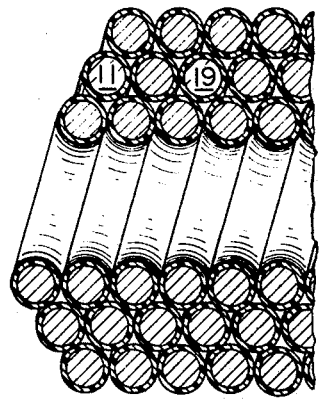
FIGURE 2 is a section of a coil made in accordance with our invention.

A magnet wire 10 suitable for service at temperatures of 500° C. and higher has a copper conductor 11 that has been covered by a nickel sheath 12. Copper is selected because of its high electrical conductivity but silver has also been used and, of course, in applications where high conductivity is not important other metals such as iron, nickel, stainless steel, molybdenum, etc., may be used for the conductor 11 within the scope of our invention. In the illustrated embodiment, since the conductor 11 is copper which may alloy with nickel at high temperatures, a coating 13 of iron is interposed between the copper and the nickel as disclosed in application Ser. No. 354,885.

Over the nickel sheath 12 there is a layer of enamel 14 in which there are dispersed particles 16 of glass and particles 17 of $Cr_2O_3$. The glass has the composition:

| | Parts by weight |
|---|---|
| $SiO_2$ | 38.0 |
| BaO | 32.2 |
| $K_2O$ | 11.6 |
| $Na_2O$ | 5.0 |
| $Li_2O$ | 1.8 |
| ZnO | 8.0 |
| $CaF_2$ | 2.0 |
| CoO | 0.5 |
| NiO | 0.5 | and is made by mixing together 380 parts of flint, 417 parts of barium carbonate, 170 parts of potassium carbonate, 100 parts of crystal sodium carbonate (one water of crystallization), 49 parts of lithium carbonate, 80 parts of zinc oxide, 20 parts of calcium fluoride, 5 parts of cobalt oxide and 5 parts of nickel oxide. The mix is gradually fired at a temperature increase of 250° C. per hour to 750° C. for four hours. At this temperature the frit is easily pourable and is quenched and shattered by pouring into water. The shattered frit is then dried and mixed with 20% of its weight of chrome oxide and dry ball-milled with alumina pebbles until the powder passes 200 mesh. The powder is then mixed in the weight ratio of 0.8 part of powder to 1.0 part of dry diphenyl siloxane resin modified with terephthalic polyester resin in 40% solids solution, and further ball-milled for 72 hours. The slurry removed from the ball mills constitutes a new enamel that can be applied to magnet wire, glass tapes, etc., for high temperature insulation service.

The preferred polyester modified silicone resin used for the illustrated embodiment of our invention is commercially available in xylol solution as Dow Corning Silicone Resin No. 1090 comprised by weight of 20 parts methyl phenol silicone and 80 parts of polyethylene terephthalate, but other resins that may be used include known types of unblended polyester resins, polyvinyl formal, acrylic ester polymers, and nylon. Where increased abrasion resistance is desired, an unpigmented coating 18 of nylon, or other tough enamel, may be applied over the enamel 14 as described in copending application Ser. No. 475,273, now Patent No. 3,446,660, assigned to the assignee of the present application.

Although we prefer to employ $Cr_2O_3$ as the refractory oxide that is ball-milled with the glass frit, other refractories may be used within the scope of our invention, such for example, as alumina, silica, and titania. In the illustrated embodiment the $Cr_2O_3$ is, in fact, mixed with some silica that results from the combustion of the silicone resin in the enamel.

Four coats of the slurry removed from the ball mills are applied to the conductor having the nickel sheath 12 on conventional magnet wire enamelling machines and baked at 325° C. for ten seconds, for each coat. This is applied to a fine No. 30 AWG wire. For heavy wire, such as No. 18 AWG, the baking would be 30 seconds per coat.

The wire leaving the enamelling machine is tough and dry and can be handled in commercial coil forming equipment. A plurality of turns of the wire 10 are formed into a coil which is fired in an oven at about 500° C. to burn and evaporate off the coating 18 and the resin moiety of the enamel 14. The temperature is then raised to about 700° C. to fuse the glass particles 16 and form a glass matrix coating 19 on the conductor 11.

The description given hereinabove of our enamel and products made therewith are exemplary rather than definitive and other embodiments coming within the scope of our invention are defined by the appended claims.

We claim:

1. An enamel for insulating electrical components for high temperatures service comprising:
   (A) an organic resin composition,
   (B) a solvent for said composition, said resin being dissolved in said solvent to form a coating enamel,
   (C) glass particles suspended in said enamel,
      (a) said particles equalling 50 to 150% of the weight of said resin,
      (b) the composition of said particles being:

| | Parts by weight |
|---|---|
| $SiO_2$ | 32–46 |
| BaO | 25–35 |
| $K_2O$ | 10–13 |
| $Na_2O$ | 4–6 |
| $Li_2O$ | 1–3 |
| ZnO | 6–10 |
| $CaF_2$ | 1–4 |
| CoO | 0–1.2 |
| NiO | 0–1.2 | and
   (D) 10–30% of the weight of said glass particles of refractory oxide particles suspended in said enamel.

2. The enamel of claim 1 wherein said resin composition comprises a blend of silicon resin and polyester resin.

3. The enamel of claim 1 wherein said refractory oxide comprises $Cr_2O_3$.

(References on following page)

References Cited

UNITED STATES PATENTS

| | | | |
|---|---|---|---|
| 2,724,704 | 11/1955 | Millar | 260—40 |
| 3,294,731 | 12/1966 | Saums et al. | 260—40 |
| 3,383,344 | 5/1968 | Gill | 260—40 |

MORRIS LIEBMAN, Primary Examiner

L. T. JACOBS, Assistant Examiner

U.S. Cl. X.R.

260—40; 106—66